United States Patent [19]

Myers et al.

[11] Patent Number: 4,990,190

[45] Date of Patent: Feb. 5, 1991

[54] STRENGTH ENHANCING ADDITIVE FOR CERTAIN PORTLAND CEMENTS

[75] Inventors: David F. Myers, Columbia; Ellis M. Gartner, Silver Spring, both of Md.

[73] Assignee: W. R. Grace & Co.-Conn., New York, N.Y.

[21] Appl. No.: 418,071

[22] Filed: Oct. 6, 1989

[51] Int. Cl.$^5$ ............................................... C04B 7/38
[52] U.S. Cl. ...................................... 106/727; 106/724
[58] Field of Search ........................................... 106/90

[56] References Cited

U.S. PATENT DOCUMENTS

| | | | |
|---|---|---|---|
| 2,437,842 | 3/1948 | Ohler | 106/90 |
| 2,776,901 | 1/1957 | Scripture . | |
| 2,776,902 | 1/1957 | Scripture . | |
| 2,776,903 | 1/1957 | Scripture . | |
| 3,202,521 | 8/1965 | Lorenzen . | |
| 4,318,774 | 3/1982 | Dodson . | |
| 4,373,956 | 2/1983 | Rosskopf . | |
| 4,401,472 | 8/1983 | Gerber . | |
| 4,473,405 | 9/1984 | Gerber . | |
| 4,488,910 | 12/1984 | Nicholson et al. . | |
| 4,519,842 | 5/1985 | Gerber . | |
| 4,606,770 | 8/1986 | Gerber . | |
| 4,828,624 | 5/1989 | Valle . | |

FOREIGN PATENT DOCUMENTS 867323 6/1979 Italy .
83/02938 9/1983 World Int. Prop. O. .

OTHER PUBLICATIONS

Zement-Kalk-Gips "Effect of Amino Components on the Setting and Hardening of Portland Cements", Von L. Muller (1974).

Primary Examiner—William R. Dixon, Jr.
Assistant Examiner—Alan A. Wright
Attorney, Agent, or Firm—Howard J. Troffkin

[57] ABSTRACT

This invention relates to a method of producing enhanced strength portland cements. Under the process of this invention, certain portland cements, in particular those containing at least 4% $C_4AF$ and up to 0.2% of a strength enhancing additive comprising triisopropanolamine, exhibit a marked increase in 7 and 28 day compressive strength. The triisopropanolamine strength enhancing additive may be admixed with cement powder or may be interground as a grinding aid with cement clinkder during finish milling.

20 Claims, No Drawings 4,990,190

STRENGTH ENHANCING ADDITIVE FOR CERTAIN PORTLAND CEMENTS

BACKGROUND OF THE INVENTION

1. Field of the Invention

This invention relates to an improved portland cement, and more specifically to a hydraulic portland cement containing a strength enhancing additive. The strength enhancing additive of this invention comprises triisopropanolamine, which may be added to cement clinker as a grinding aid and pack set inhibitor or may be added as an admixture to cement powder to enhance the 28-day strength of the mix.

2. Description of the Prior Art

The term cement is used to designate many different kinds of materials useful as binders or adhesives. Hydraulic cements are powdered materials which, when mixed with water, form a paste that hardens slowly to form rock-hard products such as mortar or concrete. Portland cement is distinguished from other cements by the different components of which it is composed, and the requirement that it meet particular standard specifications established in each country (see *Cement Standards of the World,* Cembureau, Paris, Fr.) For example, in the U.S., the American Society for Testing and Materials (ASTM), American Association of State Highway and Transportation Officials, as well as other government agencies, have set certain basic standards for cement which are based on principal chemical composition requirements of the clinker and principal physical property requirements of the final cement mix. For purposes of this invention the term portland cement is intended to include all cementitious compositions which meet either the requirements of the ASTM (as designated by ASTM Specification C150), or the established standards of other countries.

Portland cement is prepared by sintering a mixture of components including calcium carbonate (as limestone), aluminum silicate (as clay or shale), silicon dioxide (as sand), and miscellaneous iron oxides. During the sintering process, chemical reactions take place wherein hardened nodules, commonly called clinkers, are formed. Portland cement clinker is formed by the reaction of calcium oxide with acidic components to give, primarily tricalcium silicate dicalcium silicate, tricalcium aluminate, and a ferrite solid solution phase approximating tetracalcium aluminoferrite. The conventional cement chemists notation uses the following abbreviations:
$CaO = C$
$SiO_2 = S$
$Al_2O_3 = A$
$Fe_2O_3 = F$
thus:
tricalcium silicate $= C_3S$
dicalcium silicate $= C_2S$
tricalcium aluminate $= C_3A$
tetracalcium aluminoferrite $= C_4AF$ After the clinker has cooled, it is then pulverized together with a small amount of gypsum (calcium sulfate) in a finish grinding mill to provide a fine, homogeneous powdery product known as portland cement. Due to the extreme hardness of the clinkers, a large amount of energy is required to properly mill them into a suitable powder form. Energy requirements for finish grinding can vary from about 33 to 77 kW h/ton depending upon the nature of the clinker. Several materials such as glycols, alkanolamines, aromatic acetates, etc., have been shown to reduce the amount of energy required and thereby improve the efficiency of the grinding of the hard clinkers. These materials, commonly known as grinding aids, are processing additives which are introduced into the mill in small dosages and interground with the clinker to attain a uniform powdery mixture. In addition to reducing grinding energy, the commonly used processing additives listed above are frequently used to improve the ability of the powder to flow easily and reduce its tendency to form lumps during storage.

Various other additives may be incorporated into the cement to alter the physical properties of the final cement. For example, alkanolamines such as monoethanolamine, diethanolamine, triethanolamine and the like are known to shorten the set time as well as enhance the one-day compressive strength of cements. However, these additives usually have little beneficial effect on the 28-day strength of the finished cement, and in some cases may actually diminish it. Various other polymeric amines and imines have been used as 28-day cement strength enhancers, however, due to the high costs of these additives, their use is somewhat limited. In many countries, a portland cement may contain up to 5% fillers or clinker substitutes. As used herein, the term "filler" refers to an inert material that has no later age strength enhancing attributes; the term "clinker substitute" refers to a material that may contribute to long term compressive strength enhancement, but usually exhibits little or no enhancement of 7 or 28-day compressive strength values. The 28-day compressive strength has particular significance and will be emphasized throughout this invention since it is the strength at this age which is most commonly used to assess the engineering properties of the final cement products.

It has now been discovered that triisopropanolamine (TIPA), which was previously believed to possess the equivalent cement additive properties as triethanolamine (TEA) (i.e. shortening set times and enhancing one-day compressive strengths), surprisingly exhibits unique strength enhancing properties, namely a marked increase in the 7 and 28-day compressive strengths of certain hydraulic portland cements. The portland cements suitable for use in this invention are those containing at least 4% tetracalcium aluminqferrite ($C_4AF$) by weight. The enhanced 7 and 28-day strengths exhibited by these cements were unexpected and unobvious since $C_4AF$ was believed to have no cementing value.

SUMMARY OF THE INVENTION

It is an object of this invention to provide a strength enhancing additive for use in certain portland cements which will improve the 7 and 28-day strength of the mix.

Another object of this invention is to provide a strength enhancing additive which, when added to the cement clinker, increases the grinding efficiency and reduces the pack set tendencies of the finished cement.

In accordance with the present invention, there has been provided a novel strength enhancing additive which comprises triisopropanolamine which, when added to portland cement at extremely low concentrations, provides improved 7 and 28-day strength enhancement over the prior art additives.

DETAILED DESCRIPTION

The present invention is directed to a strength enhancing additive for use in certain hydraulic portland cements which when incorporated into the cement mix increases the later age compressive strength of the set cement. Specifically, it has been discovered that, when triisopropanolamine is added to certain portland cements, specifically those containing at least 4% tetracalcium aluminoferrite ($C_4AF$) by weight, in a dosage range up to 0.2%, preferably less than 0.1% and most preferably between 0.005 and 0.03% by weight of the total mix, the 7 and 28-day strength of the set cement is substantially enhanced. The strength enhancement achieved at 7 and 28 days (particularly 28 days) is emphasized in this invention because of its use in standard engineering specifications.

The enhanced strength portland cements of this invention are prepared by adding up to 0.2% triisopropanolamine into the cement by either intermixing or intergrinding the additive with the cement. As used herein, the terms "intermixing" or "intergrinding" refer to the particular stage of cement processing in which the TIPA is added. Since TIPA is an effective grinding aid, i.e. reduces the energy requirements of grinding the clinker, it may be added to the clinker during the grinding stage or processing. Since there is little or no apparent loss of TIPA during the grinding process, it remains in the final uniform cement powder where it acts as a pack set inhibitor, improves the ability of the ground cement powder to flow easily, and reduces the tendency of the cement to form lumps during storage.

It is also possible to add TIPA as an admixture to powdered cements either prior to, in conjunction with, or after the addition of water when effecting the hydraulic setting of the cement. Further, the 7 and 28-day strength enhancing additive of this invention may be supplied in a pure concentrated form, or diluted in aqueous or organic diluents, and may also be used in combination with other chemical admixtures including but not limited to: accelerating admixtures, air entrainers, water-reducing admixtures, retarding admixtures (as defined in ASTM C494), and the like, and mixtures thereof. The additive can be in its neat (amine) form or may be in its neutralized form such as an acetate, gluconate, sulfate, nitrate, nitrite, and the like. Further, the additive may be converted into its ester form (e.g. an acetate ester), since, upon addition to the high pH of a hydrating cement, it will undergo hydrolysis and revert back to the alcohol form.

Suitable portland cements for use in this invention are those that contain at least 4% tetracalcium aluminoferrite ($C_4AF$), preferably greater than 5.5% $C_4AF$ and most preferably greater than 7% $C_4AF$. The effectiveness of TIPA is directly related to the amount of $C_4AF$ in the clinker. Clinkers with low $C_4AF$ contents, either due to low total iron or to a preponderance of $Fe^{II}$ at the temperature of solidification of the clinker melt phase or for any other reason, are less susceptible to the strength enhancing effects of TIPA. During $C_4AF$ hydration, ferric ions are produced in solution as a by-product. Since ferric ions are extremely insoluble at the high pH found in hydrating cement, they immediately precipitate as an amorphous ferric hydroxide gel. This gel coats the cement grain and tends to retard hydration of the cement as a whole. TIPA serves to complex with the iron at high pH and helps to remove this iron-rich coating, thereby improving the strength development of the cement. The table in example 4 clearly illustrates the variation in strength enhancement at 28 days when TIPA was added to cements varying in $C_4AF$ concentration.

The current method to determine the concentration of $C_4AF$ in a cement is by the Bogue calculation, as specified in ASTM C150. This calculation provides an estimate of the concentration of the major phases present in a cement based on an elemental analysis. The values obtained may, however, be inaccurate in many cases because the Bogue calculation does not account for differences that may occur in the thermal processing history of the cement clinker or for the presence of minor components. Because the Bogue calculation assumes the iron is present only in the $C_4AF$ phase, the calculated values for $C_4AF$ concentration will be in error when a significant fraction of the iron in a cement is present in phases other than $C_4AF$. For example, in the case of cement "L" (as illustrated in example 4), the $C_4AF$ concentration appears to be close to the normal concentration levels of the other cements, but it actually contains a low $C_4AF$ level. This suggests that the iron in this cement is not present in the $C_4AF$ solid solution as is normally the case (and assumed by the Bogue calculation), but is instead located in other phases.

For purposes of this invention, the concentration of $C_4AF$ in a cement will be calculated using data derived by x-ray diffraction (XRD) since these results are more representative of the actual $C_4AF$ concentration. Under this method, a cement sample is scanned in the region 30° to 35° $2\theta$ (CuK). The heights of the 141 $C_4AF$ peak [h($C_4AF$)] at 33.8° and the 440 $C_3A$ peak [h($C_3A$)] at 33.3° are measured and the ratio of the 141 $C_4AF$ peak height to the 440 $C_3A$ peak height is determined. This peak height ratio is proportional to the actual $C_4AF/C_3A$ concentration ratio. However, the proportionality constant (K) is not known and cannot be measured in an unambiguous way. In order to estimate this constant, the $C_4AF/C_3A$ concentration ratio was estimated from Bogue calculated values for these two phases in cements where the Bogue calculation is expected to be accurate. These Bogue-calculated $C_4AF/C_3A$ concentration ratios were then divided by the calculated peak height ratio from XRD to determine the proportionality constant, K. K was computed for 10 cements and found to have a value of $1.39 \pm 0.47$.

Next, this value of K, the XRD data, and the elemental analysis was used to compute the $C_4AF$ content for each cement. In order to do this, a mass balance was performed for alumina in the cement. The fact that all of the alumina must appear in the cement as $C_3A$, $C_4AF$, or as an impurity in the silicate phases can be expressed mathematically as $$A^{Total} = A^{C_3A} + A^{C_4AF} + \delta A^{Total}$$

where $\delta$ is defined to be the fraction of alumina which appears in the silicate phases. This equation can be rearranged to yield $$A^{total}(1-\delta) = A^{C_4AF}(1 + A^{C_3A}/A^{C_4AF})$$

The ratio $A^{C_4AF}/A^{C_3A}$ is related to the ratio $[C_4AF]/[C_3A]$ by the stoichiometry of the compounds involved, so that $$A^{C_4AF}/A^{C_3A} = 0.556 \, [C_4AF]/[C_3A]$$

A new constant, K*, can be defined such that $$A^{C_4AF}/A^{C_3A} = K^* \, (h(C_4AF)/h(C_3A)).$$

where $K^* = 0.556 K$, K being the constant of proportionality defined above. Defining the peak-height ratio $$H(C_4AF)/h(C_3A) = r$$

the mass balance can be rewritten $$A^{C_4AF} = A^{Total}(1-\delta)/(1+1/K^*r)$$

When the stoichiometric relationship between $C_4AF$ and A is employed, this can be written in the final form $$[C_4AF] = 4.77 A^{Total}(1-\delta)/(1+1/K^*r).$$

In general, the value of $\delta$ to be used in this equation is not known. However, an estimate of the $C_4AF$ content can be obtained by assuming that all of the alumina is in the $C_3A$ and $C_4AF$ phases, or $\delta = 0$. This estimate will give the highest possible value for the $C_4AF$ concentration threshold. Any value of $\delta > 0$ will lower the threshold below that computed for $\delta = 0$. Using this value for $\delta$, the value of K cited above, the value for r obtained from the XRD experiments, and the alumina content from the elemental analysis, the $[C_4AF]$ can be computed for any cement. The $C_4AF$ concentration was calculated for several cements, as shown in the column on the right in Table IV in example 4. (Note—The $C_4AF$ content of three cements (K, L, and O) were also measured using a technique described in Bulletin 166 of the Research and Development Laboratories of the Portland Cement Association. The $C_4AF$ content measured according to this bulletin agreed well with the $C_4AF$ concentration values obtained by XRD data in all these cases, whereas the Bogue calculated $C_4AF$ concentration values were inaccurate in two of the three cements (L and O).

Using the computed $[C_4AF]$, it appears that all of the cements in which TIPA provided strength enhancement have $[C_4AF]$ greater than 4.0%, whereas the two cements in which no strength enhancement was obtained have $[C_4AF]$ less than 4.0%. It appears, then, that a $[C_4AF]$ greater than 4% is required for TIPA to provide useful strength enhancement at 28 days.

It has been observed that the addition of TIPA to cements, while enhancing the later age strength of the cement, also tends to increase the amount of air entrained in the cement. Analysis of various cement samples revealed an increase in air entrainment in excess of 2% when compared to cements containing no additive. Thus, a preferred embodiment of this invention, is a stable, homogeneous mixture of the strength enhancing additive and an air detraining agent (ADA) capable of reducing or eliminating the increased air entrainment in the cement.

Various air detraining agents are known to those skilled in the art, and a choice of a particular agent is not critical per se to this invention, provided, however, that it is compatible with TIPA (i.e. non-degrading) and TIPA is soluble therein, or can be made soluble therein through addition of other ingredients. Suitable air detraining agents include, but are not limited to, nonionic surfactants such as phosphates, including tributylphosphate, phthalates, including diisodecylphthalate, block copolymers, including polyoxypropylene-polyoxyethylene-block copolymers, and the like, or mixture thereof.

The TIPA/ADA mixture may be admixed with the cement powder, or is preferably interground with the cement clinker. When intergrinding these additive mixtures during the finish milling, it is important to choose an ADA which is relatively non-volatile so that it may withstand the heat generated by the mill and thus not evaporate. The most preferred ADAs for use when intergrinding with the cement clinker are nonionic polyoxypropylene-polyoxyethylene block copolymers having a molecular weight of at least 2500.

The ratio of TIPA to ADA in the mixture is typically in the range of 1:(0.1–2) based on weight, and is preferably in the range 1:(0.15–0.40). The TIPA/ADA mixture can be added to cements in a dosage of up to 0.2% based on the TIPA content, preferably less than 0.1% and most preferably between 0.005 and 0.03%.

Without further elaboration, it is believed that one skilled in the art, using the preceding detailed description can utilize the present invention to its fullest extent. The following examples are provided to illustrate the invention, but are not to be construed as limiting the invention in any way except as indicated in the appended claims. All parts and percentages are by weight unless otherwise indicated and additives are expressed as percent active ingredients as solids based on the weight of the cement (% s/c). Compressive strengths of the cement samples were determined in accordance with ASTM method C109.

The following examples were prepared using commercially available cements and clinkers. The following table (Table A) provides an elemental analysis of the cements and clinker as oxides and the corresponding clinker compound compositional analysis as calculated by the Bogue method (ASTM C150). The sample codes as used in this table will be used throughout the following examples to indicate which cements were used therein.

TABLE A

| Analyses of Cements and Clinkers Elemental Analysis As Oxides, % by Mass | | | | | | | |
|---|---|---|---|---|---|---|---|
| Cement | Na2O | K2O | MgO | CaO | Al2O3 | Fe2O3 | SiO2 |
| A | 0.08 | 0.59 | 0.71 | 64.51 | 4.36 | 3.43 | 21.40 |
| B | 0.00 | 0.74 | 3.29 | 65.74 | 4.25 | 2.74 | 21.46 |
| C | 0.31 | 0.40 | 1.97 | 65.78 | 3.86 | 3.01 | 22.44 |
| D | 0.28 | 0.55 | 3.80 | 64.50 | 4.60 | 3.60 | 21.60 |
| E | 0.21 | 0.38 | 3.55 | 63.25 | 4.40 | 2.91 | 21.45 |
| F | 0.15 | 0.63 | 0.86 | 64.65 | 4.22 | 3.37 | 21.51 |
| G | 0.12 | 0.66 | 4.22 | 63.77 | 4.46 | 2.89 | 22.24 |
| H | 0.18 | 0.73 | 2.06 | 65.00 | 4.12 | 3.32 | 22.54 |
| I | 0.29 | 0.54 | 0.00 | 65.00 | 5.00 | 3.00 | 22.00 |
| J | 0.37 | 0.21 | 1.84 | 64.56 | 5.51 | 2.74 | 20.93 |
| K | 0.10 | 1.10 | 1.72 | 64.91 | 5.81 | 2.60 | 21.75 |
| L | 0.12 | 0.22 | 1.14 | 67.25 | 6.12 | 2.44 | 21.89 |
| M | 0.04 | 0.45 | 1.60 | 65.48 | 4.85 | 0.19 | 21.73 |
| N | 0.00 | 0.71 | 1.13 | 65.28 | 6.03 | 4.28 | 20.45 |
| O | 0.10 | 0.38 | 0.84 | 65.44 | 2.92 | 4.67 | 24.14 |
| P | 0.00 | 0.33 | 1.31 | 62.08 | 6.17 | 3.46 | 20.53 |
| Q | 0.45 | 0.28 | 2.73 | 60.95 | 3.77 | 2.19 | 21.59 |

| Cement | TiO2 | P2O5 | SO3 | L.O.I. | SrO | Mn2O3 | Total |
|---|---|---|---|---|---|---|---|
| A | 0.18 | 0.03 | 2.85 | 1.21 | 0.03 | 0.04 | 99.42 |
| B | 0.20 | 0.04 | 0.86 | 0.59 | 0.03 | 0.05 | 99.98 |
| C | 0.24 | 0.07 | 0.58 | 0.43 | 0.22 | 0.09 | 99.40 |
| D | 0.20 | 0.10 | 0.61 | 0.08 | 0.00 | 0.00 | 99.92 |
| E | 0.23 | 0.07 | 2.54 | 0.99 | 0.00 | 0.00 | 99.98 |
| F | 0.18 | 0.05 | 2.80 | 1.38 | 0.05 | 0.05 | 99.90 |
| G | 0.29 | 0.06 | 0.33 | 0.25 | 0.12 | 0.08 | 99.49 |
| H | 0.23 | 0.10 | 1.00 | 0.15 | 0.07 | 0.06 | 99.56 |
| I | 0.00 | 0.00 | 2.00 | 0.00 | 0.00 | 0.00 | 97.83 |
| J | 0.24 | 0.07 | 1.98 | 1.12 | 0.12 | 0.04 | 99.73 |
| K | 0.33 | 0.05 | 1.33 | 0.00 | 0.00 | 0.00 | 99.70 |
| L | 0.26 | 0.11 | 0.02 | 0.00 | 0.00 | 0.00 | 99.57 |
| M | 0.20 | 0.00 | 2.97 | 2.03 | 0.00 | 0.00 | 99.54 |
| N | 0.45 | 0.00 | 1.59 | 0.71 | 0.00 | 0.00 | 100.63 |
| O | 0.44 | 0.14 | 0.08 | 0.00 | 0.00 | 0.00 | 99.15 |
| P | 0.37 | 0.00 | 3.67 | 1.04 | 0.00 | 0.00 | 99.46 |
| Q | 0.30 | 0.00 | 2.55 | 1.92 | 0.00 | 0.00 | 96.73 |

Clinker Compound Compositions
Cement Compounds, ASTM C150
Calculation

Compd.

TABLE A-continued

| C3S | C2S | C3A | C4AF | Totals |
|---|---|---|---|---|
| 56.25 | 18.92 | 6.31 | 10.44 | 91.91 |
| 68.00 | 10.23 | 7.26 | 8.34 | 98.83 |
| 63.27 | 16.60 | 5.96 | 9.16 | 94.99 |
| 58.61 | 17.71 | 6.89 | 10.95 | 94.17 |
| 51.49 | 22.65 | 7.53 | 8.86 | 90.53 |
| 57.01 | 18.66 | 6.09 | 10.25 | 92.02 |
| 53.20 | 23.63 | 7.86 | 8.79 | 93.48 |
| 55.82 | 22.51 | 6.18 | 10.10 | 94.61 |
| 53.83 | 22.46 | 8.17 | 9.13 | 93.60 |
| 55.09 | 18.45 | 10.79 | 8.34 | 92.66 |
| 49.85 | 24.75 | 12.00 | 7.91 | 94.52 |
| 60.26 | 17.29 | 13.07 | 7.42 | 98.05 |
| 58.75 | 17.98 | 13.06 | 0.58 | 90.37 |
| 56.15 | 16.27 | 9.93 | 13.02 | 95.37 |
| 52.52 | 29.59 | 1.37 | 14.21 | 97.69 |
| 37.35 | 30.68 | 11.48 | 10.53 | 90.04 |
| 46.30 | 26.97 | 7.08 | 6.66 | 87.01 |

EXAMPLE 1

This example illustrates the enhanced compressive strengths of mortars produced from six different cements with the addition of triisopropanolamine (TIPA) when compared with cements prepared with no additives or with triethanolamine (TEA). Two inch mortar cubes were produced from a number of commercially available cements using the procedure specified in ASTM C109. Additives, if used, were added to the mixing water before the addition of the cement, at a dosage of 0.0002g of additive per gram of cement. Compressive strengths of the resulting cubes were measured at ages of 1, 7, and 28 days. In addition, x-ray diffraction patterns were obtained for each of the cements and the amount of $C_4AF$ present in the cement was determined using the calculation described in the specification. As is apparent from the data in Table I, the compressive strengths of cements in which TIPA was added exceeded those of cements containing no additives or TEA at 7 and 28 days, except in the case where the $C_4AF$ concentration was lowest (cement "M"). This shows that the addition of TIPA is only beneficial to the performance of those cements having at least 4% $C_4AF$.

EXAMPLE 2

This example illustrates the increase in 28-day mortar strengths with increased dosage of triisopropanolamine (TIPA) up to the optimum concentration of 0.01% TIPA.

Two inch mortar cubes were produced from a number of commercially available cements using the procedure specified in ASTM C109. TIPA, if used, was added to the mixing water before addition of the cement. The TIPA dosage was varied in order to determine the optimum dosage rate. Compressive strength measurements at 1, 7, and 28 days show that optimal TIPA dosage is generally in the region of 0.01% to 0.02%. Higher dosages sometimes provide additional small increases in strength, but at a much higher additional cost. Significantly higher dosages may also result in decreased strength The data are summarized in Table II:

TABLE II

Compressive Strengths of ASTM C109 Mortars with Varying TIPA Dosages[1]

| Cement | TIPA Dosage, % s/c | Set time, hrs[2] | Compressive Strength, psi | | |
|---|---|---|---|---|---|
| | | | 1 Day | 7 Days | 28 Days |
| A | 0.0 | 3.2 | 3470 | 8030 | 9040 |
| A | 0.005 | 3.3 | 3670 | 8360 | 9280 |
| A | 0.01 | 3.1 | 3980 | 9060 | 10730 |
| A | 0.02 | 3.3 | 3790 | 8640 | 10730 |
| A | 0.03 | 3.2 | 4160 | 8410 | 10530 |
| A | 0.05 | 3.0 | 4100 | 8190 | 11020 |
| A | 0.07 | 3.3 | 3890 | 8930 | 10560 |
| A | 0.10 | 3.6 | 3880 | 8490 | 10050 |
| P | 0.0 | nm | nm | 3740 | 5100 |
| P | 0.005 | nm | nm | 4150 | 5100 |
| P | 0.01 | 4.1 | nm | 4420 | 5450 |
| P | 0.02 | 4.0 | nm | 4330 | 5360 |
| P | 0.03 | 4.3 | nm | 4430 | 5160 |
| P | 0.04 | 4.1 | nm | 4350 | 5440 |
| Q | 0.0 | 5.1 | 1650 | 4600 | 6650 |
| Q | 0.005 | 5.3 | 1700 | 4910 | 6940 |
| Q | 0.01 | 5.5 | 1730 | 5230 | 7460 |
| Q | 0.02 | 5.8 | 1720 | 5180 | 7660 |

[1]Test conditions were modified slightly for the experiments with Cement A: w/c = 0.385 (not 0.485), sand/cement = 2.5 (not 2.75).
[2]Measured with RMU Automatic Recording Penetrometers.

TABLE I

Results of ASTM C109 Mortar Tests with TIPA and TEA
(w/c = 0.485, sand/cement = 2.75)

| Cement | Additive | Dosage, % s/c | % $C_4AF$ | Set-Time hrs. | Compressive Strength, psi | | |
|---|---|---|---|---|---|---|---|
| | | | | | 1-Day | 7-Days | 28-Days |
| E | None | — | 9.26 | 5.42 | 1970 | 4990 | 6610 |
| E | TEA | 0.02 | 9.26 | 5.25 | 2100 | 4970 | 6980 |
| E | TIPA | 0.02 | 9.26 | — | 1870 | 6100 | 8120 |
| F | None | — | 8.69 | 4.12 | 1830 | 4380 | 5720 |
| F | TEA | 0.02 | 8.69 | 3.58 | 1860 | 4060 | 5400 |
| F | TIPA | 0.02 | 8.69 | 4.08 | 2190 | 4820 | 6590 |
| I | None | — | 8.38 | 4.37 | 1390 | 5140 | 6870 |
| I | TEA | 0.02 | 8.38 | 4.33 | 1360 | 4990 | 6470 |
| I | TIPA | 0.02 | 8.38 | 4.33 | 1380 | 6320 | 8180 |
| I | None | — | 8.38 | 5.13 | 1410 | 5140 | 6720 |
| I | TEA | 0.02 | 8.38 | 4.78 | 1430 | 4790 | 6710 |
| I | TIPA 0.02 | | 8.38 | 5.05 | 1410 | 6300 | 7990 |
| M | None | — | 1.35 | 3.07 | 3780 | 5710 | 7170 |
| M | TEA | 0.02 | 1.35 | 3.20 | 3420 | 5270 | 6270 |
| M | TIPA | 0.02 | 1.35 | 3.28 | 3410 | 5070 | 6560 |
| P | None | — | 8.90 | 4.13 | 1960 | 3980 | 4740 |
| P | TEA | 0.02 | 8.90 | 4.33 | 1880 | 3600 | 4680 |
| P | TIPA | 0.02 | 8.90 | 4.12 | 2100 | 4510 | 5560 |
| J | None | — | 7.65 | 3.72 | 1680 | 6240 | 6770 |
| J | TIPA | 0.02 | 7.65 | 3.72 | 1580 | 6580 | 7350 |

EXAMPLE 3

The results presented in earlier examples show that TIPA is generally superior to TEA in its ability to improve the 28 day strength of cements. However, a shortcoming of TIPA is its inability to improve the 1-day strength of most cements. Since TEA is known to be a good 1-day strength enhancer, it was expected that replacing some TIPA in additive formulations with TEA would improve performance of the additive at 1 day, at the expense of 28-day strength. In order to test this, a number of cements were produced in a laboratory-scale ball mill. In the first test, with results shown in Table III, cements consisting of 95% clinker and 5% gypsum were produced. Additives were dissolved in 10 ml of deionized water and added to the other materials after 100 revolutions of the mill. A total of 4000 revolutions were used to produce each cement. Two inch mortar cubes were produced from these cements according to the method specified in ASTM C109. The data in the table shows that replacement of TIPA with TEA improved the 1-day strength as expected, with the 1 day strengths of TIPA/TEA mixtures falling in between those of neat TIPA and neat TEA. Unexpectedly, however, the replacement of a fraction of the TIPA with TEA also had a positive impact on the 28-day strength. Although the 28-day strength of the cement containing neat TEA was far below that of the cement containing neat TIPA, and in fact was considerably below the blank, replacing some of the TIPA with TEA improved the 28-day strength.

EXAMPLE 4

This example shows that TIPA can be either interground with cement clinker or admixed with cement powder. In the cases where TIPA was interground, 0.5g of TIPA was added to 2500g of a clinker/gypsum mixture to obtain a 0.02% dosage of the additive. The amount of gypsum in the mixture varied between 3% and 5%. These ingredients were ground for 4000 revolutions of a laboratory ball mill at 110° C. to produce cements for testing. ASTM C109 mortar tests were conducted with these cements and with duplicate controls in which TIPA was not added. In Table IV, the 28-day compressive strength of the cubes containing TIPA are expressed as a percentage of the 28-day strength of the controls.

Tests with admixed TIPA were carried out similarly. Pre-ground commercial cements were employed for this work. ASTM C109 mortars were produced, with TIPA added to the mix water, before the addition of cement, to obtain the same 0.02% dosage. As before, the 28 day compressive strengths of these mortars are expressed as a percentage of the controls in Table IV.

In order to show that TIPA is not effective as a strength enhancer unless the cement contains a significant quantity of $C_4AF$, x-ray diffraction (XRD) measurements were performed on each of the cements (lab ground or commercial) used in these experiments. Only two cements, "M" and "L", performed poorly, and in these cases the concentration of $C_4AF$ was less than 4%. It appears, then, that unless the concentration of $C_4AF$ is above 4%, addition of TIPA to cement does not enhance the 7 and 28 day compressive strength.

TABLE III

Results of Laboratory Test Grinds with TIPA/TEA Mixtures

| Cement | Additive | Dosage % s/c | Set time, hrs[1] | Compressive Strength, psi | | |
|---|---|---|---|---|---|---|
| | | | | 1 Day | 7 Days | 28 Days |
| C | none | — | 5.43 | 1740 | 5250 | 7310 |
| C | TIPA | 0.02 | 5.27 | 2080 | 6270 | 7420 |
| C | TEA | 0.02 | 4.65 | 2240 | 5480 | 6800 |
| C | TIPA:TEA 1:3 | 0.02 | 4.83 | 2220 | 5430 | 8070 |
| C | TIPA:TEA 1:1 | 0.02 | 4.65 | 2140 | 6120 | 7680 |
| C | TIPA:TEA 3:1 | 0.02 | 4.82 | 2060 | 6360 | 8080 |

[1]Measured with RMU Automatic Recording Penetrometers.

TABLE IV

Correlation Between Strength Enhancement with TIPA and the Computed $C_4AF$ Concentration for 12 Cements

| Cement/ Clinker | Type of Addition[1] | 28 Day Strength of Cement with TIPA, % of Control | % $C_4AF$ | |
|---|---|---|---|---|
| | | | From Bogue | From calculation derived in text |
| E | Ad | 123 | 8.855 | 9.263 |
| H | I.G. | 121 | 10.103 | 8.381 |
| I | Ad | 119 | 9.129 | 8.384 |
| I | Ad | 119 | 9.129 | 8.384 |
| C | I.G. | 117 | 9.159 | 8.831 |
| C | I.G. | 115 | 9.159 | 8.831 |
| F | Ad | 115 | 10.255 | 8.686 |
| C | I.G. | 112 | 9.159 | 8.831 |
| J | Ad | 109 | 8.338 | 7.649 |
| C | I.G. | 109 | 9.159 | 8.831 |
| G | I.G. | 109 | 8.794 | 9.126 |
| D | I.G. | 109 | 10.955 | 9.994 |
| K | I.G. | 107 | 7.912 | 7.162 |
| K | I.G. | 107 | 7.912 | 7.162 |
| B | I.G. | 104 | 8.338 | 9.972 |
| O | I.G. | 103 | 14.211 | 7.221 |

TABLE IV-continued

Correlation Between Strength Enhancement with TIPA
and the Computed C$_4$AF Concentration for 12 Cements

| Cement/ Clinker | Type of Addition[1] | 28 Day Strength of Cement with TIPA, % of Control | % C$_4$AF From Bogue | % C$_4$AF From calculation derived in text |
|---|---|---|---|---|
| C | I.G. | 102 | 9.159 | 8.831 |
| M | Ad | 91 | 0.578 | 1.350 |
| L | I.G. | 89 | 7.425 | 3.572 |
| L | I.G. | 84 | 7.425 | 3.572 |

[1]"Ad" = admixed, "I.G."-interground

EXAMPLE 5

As further evidence of the unexpected strength enhancing properties of TIPA, the relative strength enhancement at 28 days for various cements were compared when hydroxyethyl and hydroxypropyl derivatives of ammonia and hydroxyethyl and hydroxypropyl derivatives of ethylenediamine were admixed into respective samples of portland cements. Table V clearly shows the significant increase in strength enhancement when TIPA was admixed with a portland cement as compared to the TEA-containing cements (i.e. going from a hydroxyethyl to a hydroxypropyl derivative of ammonia). However there is no corresponding increase in strength enhancement when comparing the tetra(hydroxyethyl)ethylenediamine (THEED) containing cement to the tetra(hydroxypropyl)ethylenediamine (THPED) containing cement (i.e. going from a hydroxyethyl to a hydroxypropyl derivative of ethylehediamine) and, in fact, the data indicate there is actually a decrease in strength enhancement.

TABLE V

Difference in properties between hydroxyethyl and hydroxypropyl derivatives of ethylenediamine and ammonia

| Cement | Mode of Addition | Strength at 28 Days, % of Blank | | | |
|---|---|---|---|---|---|
| | | TEA | TIPA | THEED | THPED |
| F | Ad | 107 | 117 | 127 | 115 |
| E | Ad | 105 | 122 | 122 | 112 |

Ad = admixed

EXAMPLE 6

Cements were produced by grinding a mixture of clinker (N) (79.3%), limestone (14.9%), kiln dust (2.9%), and gypsum (2.9%) for 2500 revolutions of a laboratory scale ball mill. TIPA (0.5g in 2500g of cement, or 0.02%) was added to each cement after 100 revolutions of the mill. In all but one case, an air detraining agent was also added at this stage. Mortar cubes were produced for compressive strength tests using the procedure specified in ASTM C109, and standard mortars for air content tests were produced according to ASTM C185. The results of these tests are shown in Table VI. Note that all of the tested air detraining agents were effective in lowering the air content relative to the control which only contained TIPA. The addition of the air detrainers also had the effect of improving the compressive strengths at all ages.

TABLE VI

TIPA/Air Detraining Agent (ADA) Mixtures

| ADA | ADA Dose % s/c | Blaine SSA, % | ASTM C-185 Air Content, % | Compressive Strength, psi | | |
|---|---|---|---|---|---|---|
| | | | | 1 Day | 7 Days | 28 Days |
| none | — | 401 | 9.2 | 2210 | 4430 | 4920 |
| Co-Polymer[1] | 0.004 | 392 | 8.1 | 2650 | 5150 | 5530 |
| Co-Polymer | 0.005 | 407 | 7.9 | 2670 | 4960 | 5200 |
| DF110L[2] | 0.005 | 404 | 8.1 | 2480 | 4540 | 5080 |
| Motor Oil[3] | 0.005 | 399 | 8.3 | 2490 | 4560 | 5320 |
| DIDP[4] | 0.005 | 409 | 8.2 | 2570 | 4820 | 5690 |

Notes:
[1]Co-Polymer is polyoxyethylene-polyoxypropylene block copolymer having a molecular weight of at least 2500.
[2]DF110L is a product of Air Products.
[3]Motor oil used was Quaker State 10W30.
[4]DIDP = Diisodecylphthalate

What is claimed:

1. A strength enhanced hydraulic cement mix comprising a hydraulic portland cement in an amount up to 80 percent by weight based upon the total weight of said cement mix and said cement containing at least 4% C$_4$AF, sufficient water to effect hydraulic setting of the cement, and triisopropanolamine in an amount of less than 0.2% which is sufficient to increase the 7 and 28-day compressive strength of the mix.

2. A strength enhanced hydraulic cement mix according to claim 1 wherein the effective amount of additive in the cement is less than 0.1%.

3. A strength enhanced hydraulic cement mix according to claim 1 wherein the effective amount of additive in the cement is between 0.005 and 0.03%.

4. The strength enhanced hydraulic cement mix according to claim 1 wherein the hydraulic cement contains at least 5.5% C$_4$AF.

5. The strength enhanced hydraulic cement mix according to claim 1 wherein the hydraulic cement contains at least 7% C$_4$AF.

6. A strength enhanced hydraulic cement mix according to claim 1 wherein the hydraulic cement contains at least 7% C$_4$AF and the effective amount of additive is between 0.005 and 0.03%.

7. The strength enhanced hydraulic cement mix according to claim 1 wherein the additive comprises a mixture of triisopropanolamine and an other additive amount cement admixtures selected from the group consisting of accelerating admixtures, air entrainers, air detrainers, water reducing admixtures and retarding admixtures.

8. The strength enhanced hydraulic cement mix according to claim 7 wherein the additive comprises a mixture of triisopropanolamine and a polyoxypropylene-polyoxyethylene block copolymer having a molecular weight of at least 2500.

9. The strength enhanced hydraulic cement mix according to claim 7 wherein the additive comprises a mixture of triisopropanolamine and triethanolamine.

10. The strength enhanced hydraulic cement mix according to claim 7 wherein the additive comprises a mixture of triisopropanolamine, triethanolamine, and a polyoxypropylene-polyoxyethylene block copolymer having a molecular weight of at least 2500.

11. A process for enhancing the strength of hydraulic portland cement mixes comprising adding triisopropanolamine in an amount of less than 0.2% which is effective to enhance the 7 and 28-day strength of the mix into a cement having at least 4% $C_4AF$.

12. A process according to claim 11 wherein the effective amount of additive in the cement is less than 0.1%.

13. A process according to claim 11 wherein the effective amount of additive in the cement is between 0.005 and 0.03%.

14. A process according to claim 11 wherein the additive comprises a mixture of an additive amount of triisopropanolamine and other cement admixtures selected from the group consisting of accelerating admixtures, air entrainers, air detrainers, water reducing admixtures and retarding admixtures.

15. A process according to claim 14 wherein the additive comprises a mixture of triisopropanolamine and a polyoxypropylene-polyoxyethylene block copolymer having a molecular weight of at least 2500.

16. A process according to claim 15 wherein the triisopropanolamine is interground with cement clinker.

17. A process according to claim 14 wherein the additive comprises a mixture of triisopropanolamine and triethanolamine.

18. A cement additive which enhances the strength of hydraulic portland cements which contain at least 4% $C_4AF$ comprising a mixture of triisopropanolamine and an effective amount of other cement additives selected from the group consisting of accelerating admixtures, air entrainers, air detrainers, water reducing admixtures and retarding admixtures.

19. A cement additive according to claim 18 wherein the additive comprises a mixture of triisopropanolamine and triethanolamine.

20. A cement additive according to claim 18 comprising a mixture of triisopropanolamine and a polyoxypropylene polyoxyethylene block copolymer having a molecular weight of at least 2500.

* * * * *

UNITED STATES PATENT AND TRADEMARK OFFICE
CERTIFICATE OF CORRECTION

PATENT NO. : 4,990,190
DATED : February 5, 1991
INVENTOR(S) : David F. Myers
Ellis M. Gartner It is certified that error appears in the above-identified patent and that said Letters Patent is hereby corrected as shown below:

In Claim 7, at line 3, delete "other"; and at line 4, after "amount" insert --of other--.

In Claim 18, at line 4, delete "effective" and insert --additive--.

Signed and Sealed this

Fifth Day of January, 1993

Attest:

DOUGLAS B. COMER

Attesting Officer

Acting Commissioner of Patents and Trademarks